US011550276B1

United States Patent
Lee (10) Patent No.: US 11,550,276 B1
(45) Date of Patent: Jan. 10, 2023

(54) ACTIVITY CLASSIFICATION BASED ON MULTI-SENSOR INPUT

(71) Applicant: ObjectVideo Labs, LLC, Tysons, VA (US)

(72) Inventor: Jangwon Lee, Tysons, VA (US)

(73) Assignee: Object Video Labs, LLC, Tysons, VA (US)

( * ) Notice: Subject to any disclaimer, the term of this patent is extended or adjusted under 35 U.S.C. 154(b) by 295 days.

(21) Appl. No.: 16/857,271

(22) Filed: Apr. 24, 2020

Related U.S. Application Data (60) Provisional application No. 62/837,950, filed on Apr. 24, 2019.

(51) Int. Cl.
| | | |
|---|---|---|
| G06V 10/00 | (2022.01) | |
| G05B 19/02 | (2006.01) | |
| G06K 9/62 | (2022.01) | |
| G06N 3/08 | (2006.01) | |
| G06V 10/40 | (2022.01) | |

(52) U.S. Cl.
CPC ............ G05B 19/02 (2013.01); G06K 9/629 (2013.01); G06K 9/6256 (2013.01); G06K 9/6262 (2013.01); G06N 3/08 (2013.01); G06V 10/40 (2022.01); *G05B 2219/25011* (2013.01)

(58) Field of Classification Search
CPC .. G06K 9/00; G06T 7/292; G06T 7/55; G06T 7/70; G06T 7/73
See application file for complete search history.

(56) References Cited

U.S. PATENT DOCUMENTS

| | | | | |
|---|---|---|---|---|
| 2018/0249435 | A1* | 8/2018 | Yu | ............................ H04W 4/80 |
| 2019/0043064 | A1* | 2/2019 | Chin | ................... G06Q 30/0201 |
| 2019/0209022 | A1* | 7/2019 | Sobol | .................... A61B 5/6804 |
| 2019/0294889 | A1* | 9/2019 | Sriram | ................. G06V 20/584 |
| 2021/0279475 | A1* | 9/2021 | Tusch | ................. H04L 63/0861 |

OTHER PUBLICATIONS

C. Xu et al., "Multi-loss Regularized Deep Neural Network," in IEEE Transactions on Circuits and Systems for Video Technology, vol. 26, No. 12, pp. 2273-2283, Dec. 2016, doi: 10.1109/TCSVT.2015.2477937. (Year: 2016).*

* cited by examiner

*Primary Examiner* — Li Liu
(74) *Attorney, Agent, or Firm* — Fish & Richardson P.C.

(57) ABSTRACT

A method for classifying activity based on multi-sensor input includes receiving, from two or more sensors, sensor data indicating activity within a building, determining, for each of the two or more sensors and based on the received sensor data, (i) an extracted feature vector for activity within the building and (ii) location data, labelling each of the extracted feature vectors with the location data, generating, using the extracted feature vectors, an integrated feature vector, detecting a particular activity based on the integrated feature vector, and in response to detecting the particular activity, performing a monitoring action.

20 Claims, 4 Drawing Sheets

ACTIVITY CLASSIFICATION BASED ON MULTI-SENSOR INPUT

CROSS REFERENCE TO RELATED APPLICATIONS

The present application is a utility application which claims priority under 35 U.S.C § 119 to U.S. Provisional Patent Application No. 62/837,950 entitled "Activity Classification Based on Multi-Sensor Input," filed Apr. 24, 2019. This application is herein expressly incorporated by reference in its entirety for all purposes.

TECHNICAL FIELD

This disclosure generally relates to monitoring systems, and more particularly to recognizing human activity.

SUMMARY

Techniques are described for utilizing location information of sensors by representing the sensors in a map-based feature embedding space and integrating feature vectors from multiple sensors to recognize human activity. Properties of each sensor can be stored in association with the sensor in the map-based feature embedding space. These sensor properties can be used to create an embedding space for activity recognition using multiple sensory inputs. The map-based feature embedding spaces can be implemented in 2D. In some implementations, the map-based feature embedding spaces can be implemented in 1D or 3D for multi-data fusion of sensor data from multiple sensors.

Human activity recognition is utilized when building a wide range of intelligent systems such as autonomous vehicles, intelligent security systems, and smart devices or buildings. One technique of recognizing human activity involves applying deep convolutional neural networks (CNN) with input from multiple sensors. A new technique described in this application applies location information in conjunction with input from multiple sensors to recognize human activities by utilizing the location information to integrate the data from multiple sensors. Location information for each sensor is represented in a 2D map-based feature embedding space, which allows sensor information to be stored and associated with location information. This location information is then integrated with feature vectors from multiple sensors to improve activity recognition.

Techniques for deep learning-based multi-data fusion include extracting feature vectors from each sensory input using CNN, concatenating each feature vector into a single feature vector, and then training the network with a loss function and the integrated feature vector. For example, sensor input is provided to a convolution layer. The output from the convolution layer is provided to a pooling function, and the discretized output is provided to other neural network layers, such as hidden layers. The output of the hidden layers is provided to be integrated and this combined output is provided to a classifier. However, these processes do not address different properties of different sensors. For example, these techniques generally extract feature vectors of the same dimensions from all sensors without considering the different properties of different types of sensors with different capabilities, ranges, locations, etc. The installation location of each sensor is known in many applications. However, this information is not generally used to compensate for the properties of each sensor.

In the technique described in this application, the extracted feature vectors from the multiple sensors are represented in the form of a 2D map that represents a target location. For example, the map can represent the floor plan of a home, a factory, an office building, etc. The extracted feature vectors are then integrated into a single feature vector and used as input to a classifier. The installation location of each sensor is generally known, and each sensor has its own properties and constraints; and thus proper weights can be assigned to each sensor according to where the activity happens and the properties of each sensor to obtain better activity classification recognition.

For example, if a home has two sensors, a camera and a microphone, these sensors can have different hardware specifications or different ranges and capabilities. Sensors can include audio sensors, visual sensors, motion sensors, heat sensors, etc. The sensors can be used to calculate the location, direction, type, etc. of an activity performed within a particular area of interest. Additionally, each of these sensors can be installed in a different location. In one example, the camera can be installed facing the front door and the microphone can be installed in the kitchen. These installation locations can provide additional information regarding the type of activity that is likely to occur. For example, the opening of a window in a kitchen is more likely to be performed by an occupant to let in fresh air, whereas an opening of a window in an unoccupied back room is more likely to be performed by an intruder to gain unauthorized access.

In some implementations, the technique can include receiving video data in addition to, or instead of, static image data. The system can process location and sensor data for multiple frames. For example, the system can process at least two frames to determine optical flow and interframe information. Changes between the frames can be used as additional data to classify an activity and/or determine the location of the activity.

Each sensor can have different specifications, including what properties the sensor can detect, the distance at which the sensor can detect its specific properties, the mechanism by which the sensor detects properties, etc. The distance at which the sensor can detect a property, or the range of the sensor, can be specific to the type of sensor or the particular sensor. For example, the microphone can have a broader range than the camera. The system has access to hardware specification data for each sensor, such as the sensor type, the range of the sensor, the calibration data for the sensor, etc.

Each sensor's position and range can be represented visually on a map. For example, an indoor environment, such as the first floor of a residential home, is presented as a two-dimensional grid. In some implementations, the property can be represented in a three-dimensional space. The maps have particular dimensions. For example, the first floor of the home can be presented in a 4×4 two-dimensional grid. The microphone can have a set range that is represented in the map based on the area that the microphone can cover, and the camera can have a set range that is represented in the map based on the area the camera can cover. For example, the camera may have a field of view of less than 90°, and the angle, placement, and range of the camera can be represented in the map. The microphone may be multidirectional, and the placement and range of the microphone can be represented, for example, as a circular boundary around the microphone.

The technique described in this application receives and uses input from all sensors in an area of interest to generate an output that indicates the predicted location of the activity and a classification of an activity that has occurred in the area of interest. For example, the location of the activity can be provided as a location on the two dimensional map of the first floor, and the activity classification can be the opening of a door by an occupant.

One area of interest can encompass multiple people, who can each be performing different actions. For example, three different people can be in the first floor of the home. There can be two people in the living room and one person in the kitchen. The person in the kitchen and one person in the living room can be sitting down while another person in the living room can be walking into the dining room.

In one general implementation of the technique described in this application, a method for activity classification based on multi-sensor input includes receiving, from two or more sensors, sensor data indicating activity within a building, determining, for each of the two or more sensors and based on the received sensor data, (i) an extracted feature vector for activity within the building and (ii) location data, labelling each of the extracted feature vectors with the location data, generating, using the extracted feature vectors, an integrated feature vector, detecting a particular activity based on the integrated feature vector, and in response to detecting the particular activity, performing a monitoring action.

In some implementations, the location data indicates a location of the sensor. In some implementations, the integrated feature vector represents a composite of two or more different extracted feature vectors that each represent one or more features of a single sensor. The one or more features of the single sensor can include sensor specification data.

In some implementations, detecting a particular activity includes classifying the received sensor data, using the activity classification model and based on the integrated feature vector. In some implementations, determining, for each of the two or more sensors, the location data includes detecting location data from a map-based feature embedding space. The map-based feature embedding space can be a two-dimensional representation of (i) a physical location and (ii) one or more features of one or more sensors.

In some implementations, detecting a particular activity based on the integrated feature vector comprises providing, as input to a machine learning model using convolutional neural networks, the received sensor data. The machine learning model can implement a loss function for activity classification, representing the type of the particular activity. The machine learning model can implement a loss function for activity localization, representing the physical location of the particular activity.

In some implementations, the particular activity indicates two or more different actors. In some implementations, the particular activity indicates two or more different locations.

In some implementations, the monitoring action includes taking a photo or video. In some implementations, the monitoring action includes activating a building automation system to perform an action.

Other embodiments of this aspect include corresponding systems, apparatus, and computer programs, configured to perform the actions of the methods, encoded on computer storage devices.

The technique for detecting activities and the locations of the activity are described further below.

BRIEF DESCRIPTION OF DRAWINGS

Like reference numbers and designations in the various drawings indicate like elements.

DETAILED DESCRIPTION

Figure 1:
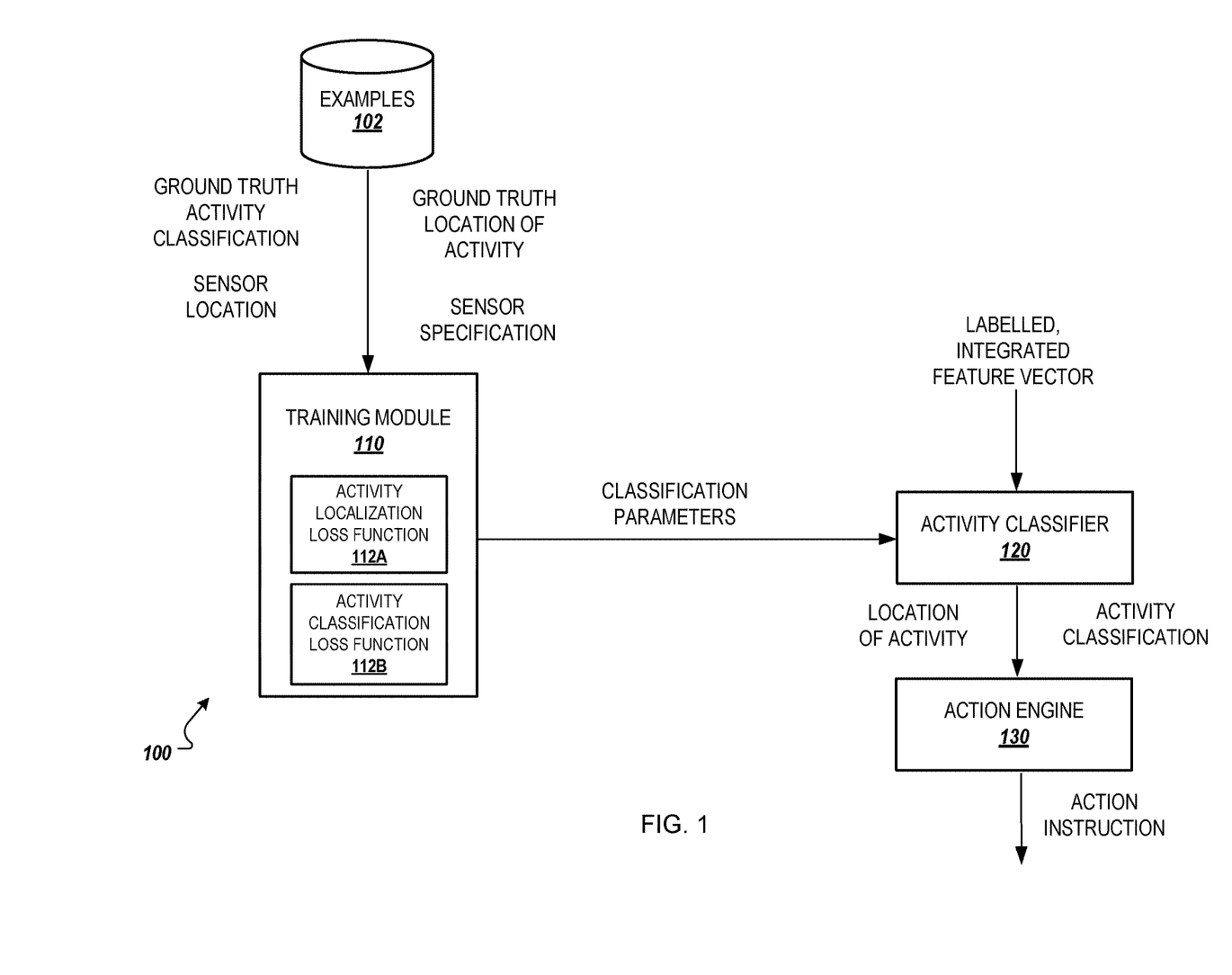
FIG. 1 illustrates an example block diagram of a system for training an activity classifier.

FIG. 1 illustrates an example block diagram of a system 100 for training an activity classifier.

Examples 102 are provided to training module 110 as input to train an activity classification model. Examples 102 can be positive examples (i.e., examples of correctly determined locations and/or activity classifications) or negative examples (i.e., examples of incorrectly determined locations and/or activity classifications).

Examples 102 include the ground truth activity classification, or an activity classification defined as the correct classification. Examples 102 also include the ground truth location of activity, or a location of activity defined as the correct location. Examples 102 include sensor information such as the installed locations of multiple sensors and the specifications of each sensor (i.e., the sensor properties).

The ground truth indicates the actual, correct location and/or the actual classification of the activity. For example, a ground truth activity classification can be generated and provided to training module 110 as an example 102 by detecting an activity, classifying the activity, determining the location at which the activity occurred, and confirming that the activity classification and location are correct. In some implementations, a human can manually verify the activity classification and location. The activity classification and location can be automatically detected and labelled by pulling data from a data storage medium that contains verified activity classifications and locations.

The ground truth activity classification and ground truth location can be correlated with particular inputs of examples 102 such that the inputs are labelled with the ground truth activity classification and ground truth location. With ground truth labels, training module 110 can use examples 102 and the labels to verify model outputs of an activity classifier and continue training the classifier.

The sensor information guides the training module 110 to train the classifier to create a map-based embedding space for data fusion of the sensor data from each of the multiple sensors according to the sensor information. The training module 110 can train the classifier to learn how to map multiple raw sensor inputs to their location within a map-based embedding space, such as a 2D map based on the sensor information. Thus, the classifier would not need additional prior knowledge during the testing phase because the classifier is able to map sensory inputs to respective embedding spaces and classify activities using the embedding space.

Training module 110 trains an activity classifier to perform activity recognition. For example, training module 110 can train an activity classifier to recognize human activity based on inputs from sensors within an area of interest.

Training module 110 trains activity classifiers using various loss functions, including activity localization loss function $112a$ and activity classification loss function $112b$. Training module 110 uses a loss function for activity localization—loss function 112a—to train an activity classifier to determine a location at which an activity has occurred. Training module 110 uses a loss function for activity classification—loss function 112b—to train an activity classifier to classify a particular activity, such as a human performed activity captured by multiple sensors within an area of interest.

The technique described in this application uses the location of an activity as additional information to be considered in the classification of an activity. Thus, an overall objection function for training module 110 is determined using a weighted sum of these two loss functions. For example, the overall objection function can be defined as:

Loss(x,predicted_location,ground-truth location)=
   Loss_activity(x,confidence activity)+
   alpha*Loss_localization(x,predicted_location,
   ground-truth_location)

where x is a binary indicator (0 or 1) that matches the predicted activity to the ground truth activity label. The predicted_location variable indicates the location of the activity in a visual representation of a particular area of interest (for example, a 2D map), and the ground-truth_location variable indicates the ground truth location of the activity in the visual representation of a particular area of interest (for example, the 2D map). The confidence-activity variable represents the confidence score of the activity classification, or the level of confidence associated with the predicted activity classification.

Training module 110 can train an activity classifier manually or the process could be automated. For example, if the floorplan of a property using the system is available, the system can receive video from the monitoring system and use the video to identify the ground truth location at which an activity occurs through automated techniques such as image recognition or identifying tagged locations within the video. A human can also manually verify the identified locations.

Training module 110 uses the loss functions 112a and 112b (either separately or as a combined objection function) and examples 102 labelled with the ground truth activity classification and the ground truth activity location to train the activity classifier to learn where and what is important for the model. Training module 110 allows the activity classifier to learn by changing the weights applied to different variables to emphasize or deemphasize the importance of the variable within the model. By changing the weights applied to variables within the model, training module 110 allows the model to learn which types of information (e.g., which sensor inputs, what locations, etc.) should be more heavily weighted to produce a more accurate activity classifier.

Training module 110 uses machine learning techniques to train an activity classifier, and can include, for example, a neural network that utilizes activity localization loss function 112a and activity classification loss function 112b to produce parameters used in the activity classifier model. These parameters can be classification parameters that define particular values of a model used by activity classifier 120.

Activity classifier 120 receives a labelled, integrated feature vector as input, and outputs activity classifications and locations based on the labelled, integrated feature vector. The labelled, integrated feature vector includes sensor data and location data from every sensor within a particular area of interest, and is described in further detail below with respect to FIGS. 2 and 3.

Activity classifier 120 utilizes a machine learning model to output the activity classifications and locations. The machine learning model uses classification parameters received from training module 110 to perform the activity classifications and determine the activity locations. The machine learning model may be a model which accepts sensor data collected by cameras and/or other sensors as inputs. The machine learning model may use any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the machine learning model may use supervised learning. In some examples, the machine learning model uses unsupervised learning.

Action engine 130 receives activity classification(s) and activity location(s) (the location at which an activity is determined to have occurred) from activity classifier 120. Action engine 130 utilizes the activity classification and location of the activity to determine an appropriate action and outputs an action instruction. The action instruction, when executed, facilitates the performance of a particular action, such as a monitoring action. For example, the action instruction can cause a message including the activity classification and location of the activity to an authorized user; an electronic lock to unlock; an alarm to sound, etc.

Figure 2:
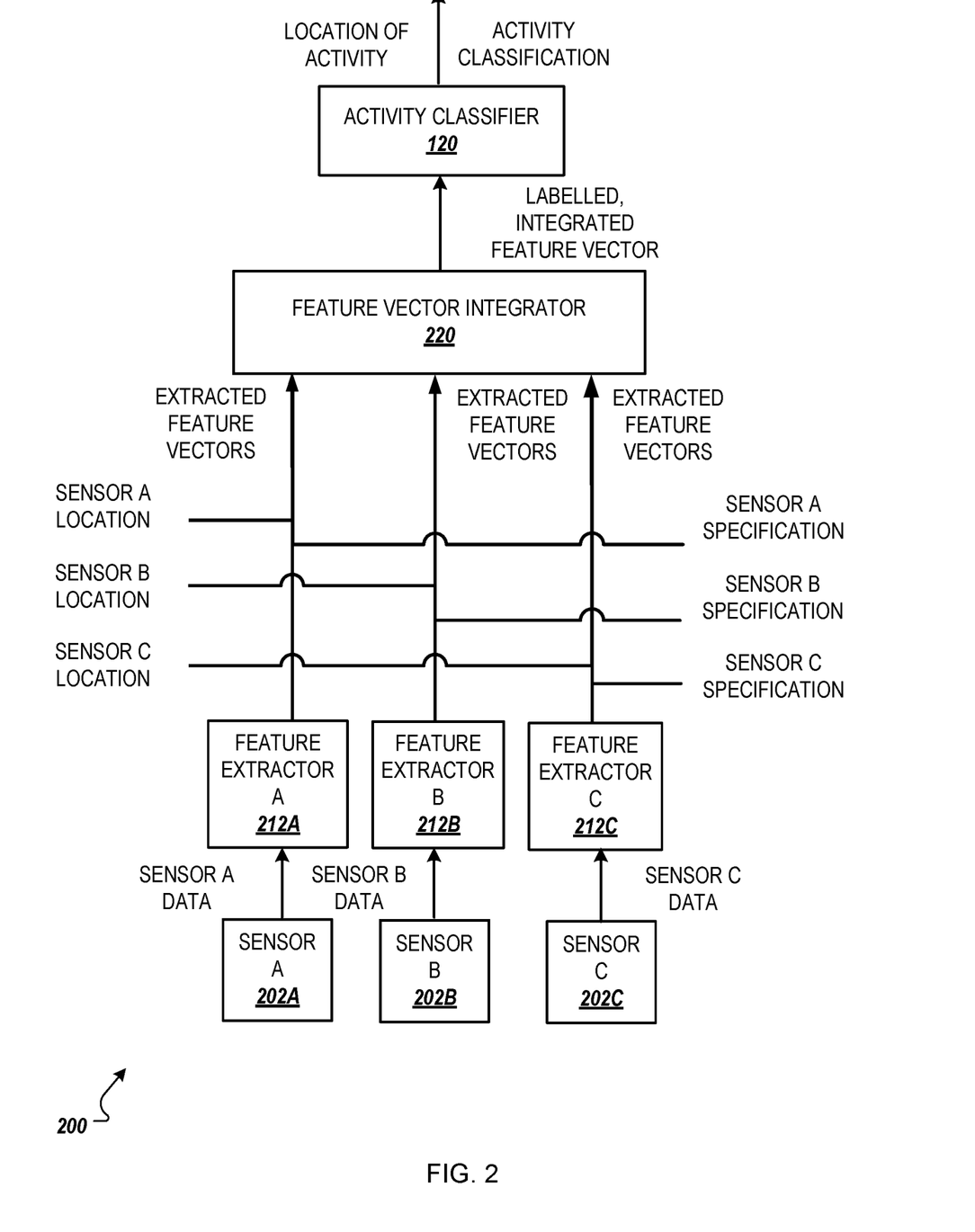
FIG. 2 illustrates an example block diagram of a system for performing the activity classification with a trained activity classifier.

FIG. 2 illustrates an example block diagram of a system 200 that performs activity classification using a trained activity classifier and integrated sensor data from multiple different sensors. System 200 can include an implementation of system 100 that trains an activity classifier.

System 200 implements the location-based multi-sensor fusion technique described in this application to perform human activity recognition. As described above, the technique utilizes a map of the target location (i.e., the first floor of the residential home) and is provided with the installed locations of each sensor of the multiple sensors. While the following description is drafted in the context of a home, it is understood that the disclosure can be directed to various types of property, such as office buildings, public buildings, etc. The map can be represented as a feature vector. For example, the map can be represented as a 2D feature vector. A feature vector is a vector of numerical features that represent a particular item, such as the map, an activity, a location, etc.

In the training phase in which an activity classifier is trained to perform activity classification, the system utilizes the map, hardware specifications of each sensor, the ground truth activity classification, and ground truth activity locations. The system first extracts feature vectors from each sensor. Each of these vectors is of the same dimensions, and these vectors are correlated with the map of the area of interest.

The system uses the hardware specification data and the installed location information of each sensor as constraints to filter out raw feature vectors from the data received from each sensor. Once the raw feature vectors are extracted from the data received from each of multiple different sensors, they are integrated together to form one integrated feature vector. This integrated feature vector is then fed into the final output layer of the activity classifier model.

The activity classifier model, which has been trained by two different loss functions (e.g., loss function 112a and loss function 112b), produces two outputs: the location of the activity, and the activity label.

Sensor A 202a, sensor B 202b, sensor C 202c, collectively referred to as sensors 202, collect data such as motion data, audio data, visual data, heat data, pressure data, resistance data, network connectivity data, etc. Each of the sensors can be a different type of sensor, and can collect data separately.

Feature extractor A 212a, feature extractor B 212b, feature extractor C 212c, collectively referred to as feature extractors 212, each receive data separately from a particular sensor. Sensor A 202a collects sensor A data and provides it to a feature extractor specific to sensor A 202a. Sensor B 202b collects sensor B data and provides it to a feature extractor specific to sensor B 202b. Sensor C 202c collects sensor C data and provides it to a feature extractor specific to sensor C 202c.

Feature extractors 212 utilize the sensor data to build derived values—i.e., features— that are informative and non-redundant such that the amount of resources required to describe a large set of data are reduced. Each of the feature extractors 212 generates and outputs a feature vector from the sensor data.

Feature vector integrator 220 integrates the extracted feature vectors from the feature extractors 212 into a single, integrated feature vector. Feature vector integrator 220 can also receive and integrate known sensor data such as sensor hardware specification data and sensor location data with the extracted feature vectors by labelling the integrated feature vector with the sensor data. For example, feature vector integrator 220 can receive hardware specification data and location data for sensor A, hardware specification data and location data for sensor B, and hardware specification data and location data for sensor C. Labelling the feature vectors includes correlating the hardware specification data and sensor location data—known values with the extracted feature vectors. Feature vector integrator 220 integrates the extracted feature vectors and labels the integrated vector with the sensor data to generate the single, labelled, integrated feature vector.

Activity classifier 120 receives the labelled, integrated feature vector from feature vector integrator 220 and performs the activity classification. For example, the activity classifier 120 receives the labelled, integrated feature vector as input and provides two outputs: the location of the activity and the activity classification.

Activity classifier 120 can utilize an activity classification model using the classification parameters from the training module 110.

Figure 3:
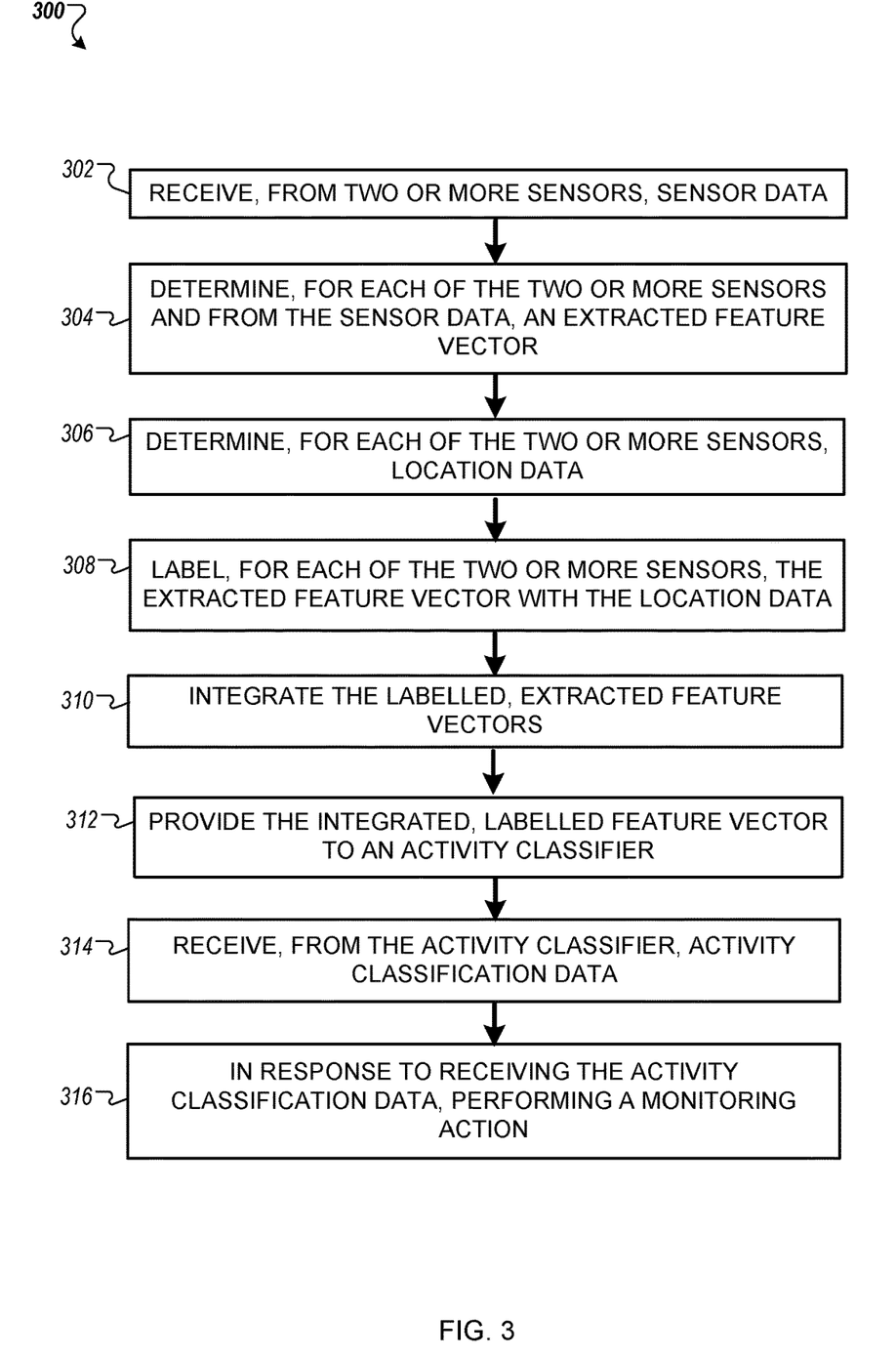
FIG. 3 illustrates a flow diagram of an example process for performing an activity classification using sensor data from multiple sensors.

FIG. 3 is a flow diagram of an example process 300 for performing an activity classification using sensor data. Process 300 can be implemented using system 100 described above. Thus, descriptions of process 300 may reference one or more of the above-mentioned components, modules, or computational devices of system 100. In some implementations, described actions of process 300 are enabled by computing logic or software instructions executable by a processor and memory of an example electronic device.

Process 300 includes receiving, from two or more sensors, sensor data (302). In some implementations, process 300 includes receiving, from two or more sensors, sensor data indicating activity within a building. For example, feature extractors 212 can receive sensor data from sensors 202. This data can include video data, audio data, heat data, motion data, etc. In some implementations, the sensor data from sensors 202 indicates activity inside of a building. For example, motion data and video data from sensors 202 can indicate a person entering the kitchen of a home.

Process 300 includes determining, for each of the two or more sensors and from the sensor data, an extracted feature vector (304). For example, each of feature extractors 212a, 212b, and 212c can extract a separate feature vector from the corresponding sensor a data, sensor b data, and sensor c data. Feature vectors each represent one or more features. For example, an extracted feature vector for a motion sensor 202 can represent a motion duration, a motion position, a motion velocity, a motion acceleration, and one or more calibration parameters. In another example, an extracted feature vector for a photoresistor 202 simply represents light intensity and a calibration scale.

In some implementations, detecting a particular activity based on the integrated feature vector includes providing, as input to a machine learning model using convolutional neural networks, the received sensor data. For example, the system 200 can provide the sensor data from sensors 202 to activity classifier 120 to output an activity classification. Activity classifier 120 can be trained by training module 110 using sensor data. In some implementations, the system can provide the sensor data from sensors 202 to training module 110 to train activity classifier 120 and can provide the sensor data from sensors 202 to activity classifier 120 to classify. In some implementations, the machine learning model implements a loss function for activity classification, representing the type of the particular activity. For example, activity classifier 120 can use a machine learning model that implements a loss function for detecting unauthorized entry into a room. In some implementations, the machine learning model implements a loss function for activity localization, representing the physical location of the particular activity. For example, activity classifier 120 can use a machine learning model that implements a loss function for detecting particular locations, within a room, of an activity occurring within the room.

In some implementations, the particular activity indicates two or more different actors. For example, an unauthorized entry activity can indicate two different unauthorized persons. The actors can include animals or objects. In some implementations, the particular activity indicates two or more different locations. For example, the unauthorized entry activity can indicate a point of entry and a current location of the unauthorized persons.

Process 300 includes determining, for each of the two or more sensors, location data (306). For example, the system 200 can receive known location data for each of the sensors 202. The location data can indicate the location of a sensor. For example, location data for a video camera 202 can indicate that the camera is in the top right corner of a residential kitchen, while location data for a motion sensor 202 can indicate that the motion sensor is located toward the base of a doorway that leads into the kitchen.

In some implementations, determining, for each of the two or more sensors, the location data includes detecting location data from a map-based feature embedding space. The map-based feature embedding space, as described above, can be a multi-dimensional representation of a physical location and one or more features of one or more sensors. For example, the map-based feature embedding space can be a 2D representation of a building that shows the location of various sensors 202 and labels each location of a sensor 202 with features of the sensor 202, such as hardware specifications and calibration data.

In some implementations, steps (304) and (306) can be performed concurrently by determining, for each of the two or more sensors and based on the received sensor data, an extracted feature vector for activity within the building and location data. For example, feature extractors 212 can extract feature vectors from the corresponding sensor data and detect location data for each of the sensors 202.

Process 300 includes labelling, for each of the two or more sensors, the extracted feature vector with the location data (308). For example, feature vector integrator 220 can label the integrated feature vector with the known sensor locations and known sensor hardware specification data. The system 200 can label each of the extracted feature vectors with the location data.

Process 300 includes integrating the labelled, extracted feature vectors (310). In some implementations, process 300 includes generating, using the extracted feature vectors, an integrated feature vector. The integrated feature vector can represent a composite of two or more different extracted feature vectors that each represent one or more features of a single sensor. For example, feature vector integrator 220 can concatenate each of the labelled feature vectors into a single, integrated feature vector. The integrated feature vector includes the labels from the labelled extracted feature vector. For example, the integrated feature vector includes labels indicating the locations and hardware specifications of each sensor for which a feature is included in the vector.

Process 300 includes providing the integrated, labelled feature vector to an activity classifier (312). For example, feature vector integrator 220 can provide the labelled, integrated feature vector to the activity classifier 120 to be used for activity classification.

Process 300 includes receiving, from the activity classifier, activity classification data (314). For example, action engine 130 can receive the output activity location and the output activity classification from activity classifier 120.

In some implementations, steps (312) and (314) can be performed concurrently or as a single, continuous step such that the system 200 detects a particular activity based on the integrated feature vector. Detecting a particular activity can include classifying, by the activity classifier 120, the received sensor data, using the activity classification model and based on the integrated feature vector. For example, feature vector integrator 220 can provide the labelled, integrated feature vector to the activity classifier 120 and receive activity classification data that indicates that a user has entered the kitchen from an adjoining room.

Process 300 includes performing, in response to receiving the activity classification data, a monitoring action (316). In some implementations, process 300 includes performing, in response to detecting a particular activity, such as the activity discussed above with respect to steps (312) and (314), a monitoring action. For example, action engine 130 can output an action instruction in response to receiving the output activity location and the output activity classification from activity classifier 120. The action instruction can cause performance of a monitoring action, such as transmitting a message to an authorized user, unlocking a door, taking a snapshot of the area of interest, activating an alarm, etc. In some implementations, the monitoring action can include, for example, communicating with a monitoring system network that includes the monitoring system of the building in which the activity is detected. For example, the monitoring system network can include activating a monitoring system network that connects monitoring systems for two or more buildings.

In some implementations, the monitoring action includes taking a photo or video. For example, the system 200 can take a photo of a user turning off a stove and the user can later check to make sure that they have turned off the stove for safety reasons. In some implementations, the monitoring action includes activating a building automation system to perform an action. For example, the system 200 can activate a building automation system to automatically turn off a stove when it is detected that a user has left the house and the stove is still on in the kitchen.

Figure 4:
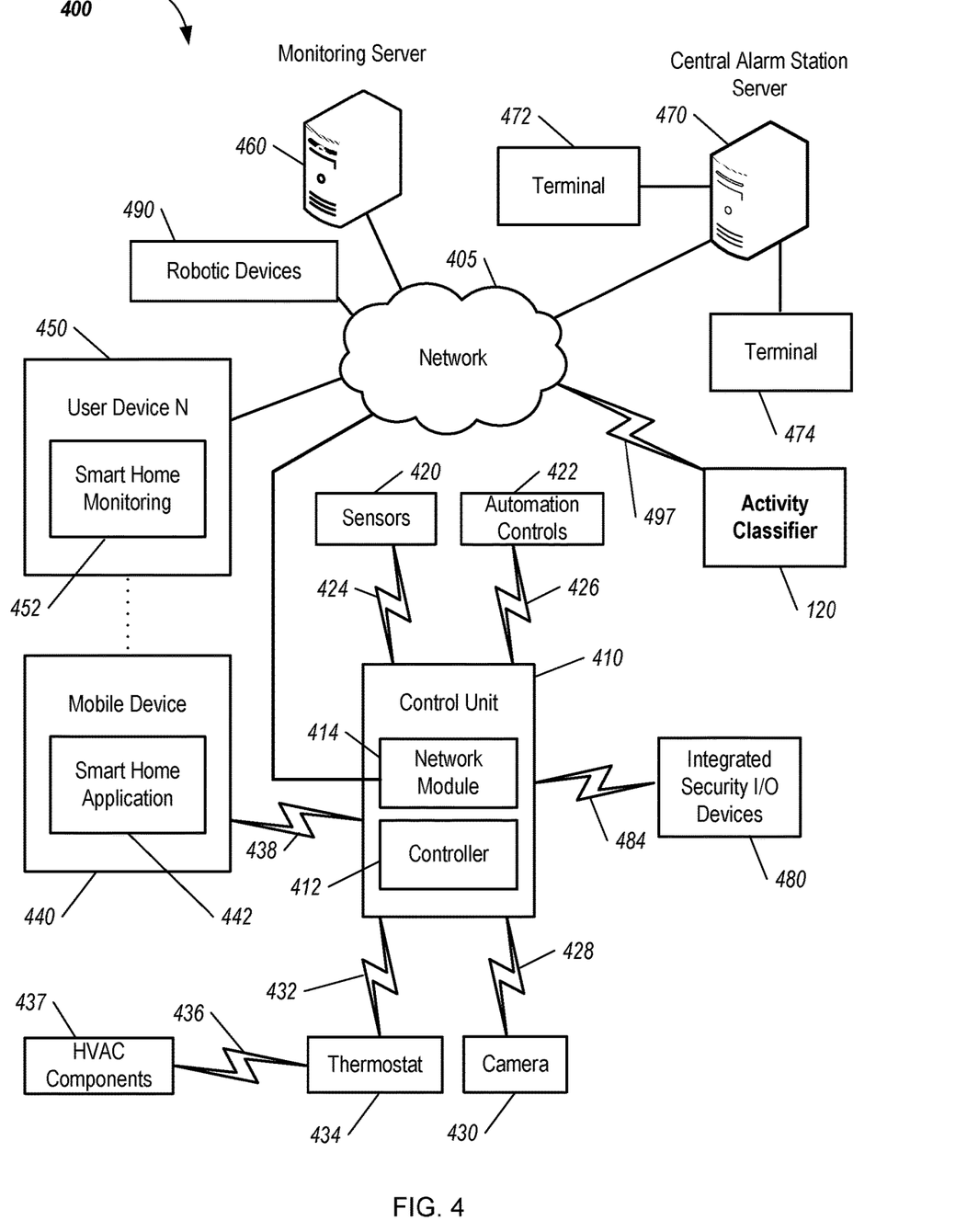
FIG. 4 illustrates an example block diagram of a home monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., user 108). For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

The system 400 also includes an activity classifier 120 in communication over communications link 497 with network 405. Activity classifier 120 of the system 400 can be implemented as described above.

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
   receiving, from two or more sensors, sensor data indicating activity within a building;
   determining, for each of the two or more sensors and using the received sensor data, (i) an extracted feature vector for the activity within the building and (ii) location data;
   labelling each of the extracted feature vectors with the location data;
   generating, using the labelled extracted feature vectors, an integrated feature vector;
   determining, using the integrated feature vector as input to an activity classifier, a classification of the activity within the building and a location of the activity; and
   in response to determining the classification of the activity within the building and the location of the activity, performing a monitoring action.

2. The method of claim 1, wherein the location data indicates a location of the sensor.

3. The method of claim 1, wherein the integrated feature vector represents a composite of two or more different extracted feature vectors that each represent one or more features of a single sensor.

4. The method of claim 3, wherein the one or more features of the single sensor include sensor specification data.

5. The method of claim 1, wherein determining the classification of the activity within the building and the location of the activity comprises classifying the received sensor data using the activity classifier and the integrated feature vector.

6. The method of claim 1, wherein determining, for each of the two or more sensors, the location data comprises detecting, for each of the two or more sensors, location data from a map-based feature embedding space that indicates a location of the corresponding sensor.

7. The method of claim 6, wherein the map-based feature embedding space is a two-dimensional representation of (i) a physical location and (ii) one or more features of one or more sensors.

8. The method of claim 1, wherein determining the classification of the activity within the building and the location of the activity using the integrated feature vector comprises providing, as input to a machine learning model using convolutional neural networks, the received sensor data.

9. The method of claim 8, wherein the machine learning model implements a loss function for activity classification, representing a type of the activity.

10. The method of claim 9, wherein the machine learning model implements a loss function for activity localization, representing the location of the activity.

11. The method of claim 1, wherein the activity indicates two or more different actors.

12. The method of claim 1, wherein the activity indicates two or more different locations.

13. The method of claim 1, wherein the monitoring action comprises taking at least one of photo or video.

14. The method of claim 1, wherein the monitoring action comprises activating a building automation system to perform an action.

15. A system comprising:
    at least one processor; and
    a memory communicatively coupled to the at least one processor, the memory storing instructions which, when executed by the at least one processor, cause the at least one processor to perform operations comprising:
    receiving, from two or more sensors, sensor data indicating activity within a building;
    determining, for each of the two or more sensors and using the received sensor data, (i) an extracted feature vector for the activity within the building and (ii) location data;
    labelling each of the extracted feature vectors with the location data;
    generating, using the labelled extracted feature vectors, an integrated feature vector;
    determining, using the integrated feature vector as input to an activity classifier, a classification of the activity within the building and a location of the activity; and
    in response to determining the classification of the activity within the building and the location of the activity, performing a monitoring action.

16. The system of claim 15, wherein the location data indicates a location of the sensor.

17. The system of claim 16, wherein the integrated feature vector represents a composite of two or more different extracted feature vectors that each represent one or more features of a single sensor.

18. The system of claim 16, wherein determining the classification of the activity within the building and the location of the activity comprises classifying the received sensor data using the activity classifier and the integrated feature vector.

19. The system of claim 16, wherein determining, for each of the two or more sensors, the location data comprises detecting, for each of the two or more sensors, location data from a map-based feature embedding space that indicates a location of the corresponding sensor.

20. A computer-readable storage device storing instructions that when executed by one or more processors cause the one or more processors to perform operations comprising:
- receiving, from two or more sensors, sensor data indicating activity within a building;
- determining, for each of the two or more sensors and using the received sensor data, (i) an extracted feature vector for the activity within the building and (ii) location data;
- labelling each of the extracted feature vectors with the location data;
- generating, using the labelled extracted feature vectors, an integrated feature vector;
- determining, using the integrated feature vector as input to an activity classifier, a classification of the activity within the building and a location of the activity; and
- in response to determining the classification of the activity within the building and the location of the activity, performing a monitoring action.

* * * * *

UNITED STATES PATENT AND TRADEMARK OFFICE
CERTIFICATE OF CORRECTION

| | | |
|---|---|---|
| PATENT NO. | : 11,550,276 B1 | |
| APPLICATION NO. | : 16/857271 | |
| DATED | : January 10, 2023 | |
| INVENTOR(S) | : Jangwon Lee | |

It is certified that error appears in the above-identified patent and that said Letters Patent is hereby corrected as shown below:

On the Title Page

Column 1, item (73) Assignee, Line 1, delete "Object Video" and insert -- ObjectVideo --.

Signed and Sealed this
Eighteenth Day of April, 2023

Katherine Kelly Vidal
*Director of the United States Patent and Trademark Office*